(12) United States Patent
Franklin et al.

(10) Patent No.: US 12,488,606 B2
(45) Date of Patent: Dec. 2, 2025

(54) SIGNATURE MERGER DURING UPLOAD PROCESS

(71) Applicant: Capital One Services, LLC, McLean, VA (US)

(72) Inventors: Keegan Franklin, Tucson, AZ (US); James Brighter, Reston, VA (US); John Maillett, Vienna, VA (US); Karin Gonzalez, Springfield, VA (US); Suranya Jayan Schott, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 261 days.

(21) Appl. No.: 18/092,626

(22) Filed: Jan. 3, 2023

(65) Prior Publication Data

US 2024/0221406 A1    Jul. 4, 2024

(51) Int. Cl.
*G06V 30/148* (2022.01)
*G06V 30/414* (2022.01)

(52) U.S. Cl.
CPC ............ *G06V 30/15* (2022.01); *G06V 30/414* (2022.01)

(58) Field of Classification Search
None
See application file for complete search history.

(56) References Cited

U.S. PATENT DOCUMENTS

| | | | |
|---|---|---|---|
| 8,626,661 B2 | 1/2014 | Gilder | |
| 9,959,533 B2 | 5/2018 | Narendra et al. | |
| 10,552,810 B1* | 2/2020 | Ethington | G06Q 20/042 |
| 10,853,771 B2 | 12/2020 | Enobakhare | |
| 10,891,605 B1 | 1/2021 | Wilson et al. | |
| 2010/0161466 A1 | 6/2010 | Glider | |
| 2013/0212008 A1 | 8/2013 | Edwards et al. | |
| 2019/0080322 A1 | 3/2019 | Elischer | |
| 2019/0244180 A1 | 8/2019 | Davies | |
| 2020/0126047 A1 | 4/2020 | Megerdichian et al. | |

OTHER PUBLICATIONS

International Search Report for International Application No. PCT/US24/10192, mailed on Apr. 17, 2024, 7 pages.

\* cited by examiner

*Primary Examiner* — Andrew H Lam
(74) *Attorney, Agent, or Firm* — Sterne, Kessler, Goldstein & Fox P.L.L.C.

(57) ABSTRACT

Systems for performing signature-based techniques on document during a document upload process are disclosed. During the document upload process, a document upload application may determine whether signature is required on the document to be uploaded and whether the required signature is present on the document. Upon determining that a signature is required but is missing from the document, document upload application may retrieve and merge the required signature with the document as part of the document upload process.

20 Claims, 5 Drawing Sheets

SIGNATURE MERGER DURING UPLOAD PROCESS

TECHNICAL FIELD

Aspects relate to systems and methods for dynamically merging required signatures to a document image during a document upload process.

BACKGROUND

Currently, computer-based (e.g., laptop) or mobile-based (e.g., mobile device) technology allows a user to initiate a document upload process for uploading images or other electronic versions of a document to a backend system (e.g., a document processing system) for various purposes. In some cases, the backend system will require these documents to be signed, such as via a signature of the user. Current processes may require the user to manually sign the document prior to initiating the document upload process because there currently does not exist a mechanism for electronically providing a signature during the upload process, especially a mechanism that complies with security requirements enforced by the backend system on uploaded documents.

SUMMARY

Provided herein are system, method, and/or computer program product embodiments, and/or combinations and sub-combinations thereof for performing signature-based techniques on a document during a document upload process between a document upload application installed on user equipment and a backend system.

An example method embodiment may include steps during a document upload process including the document upload application receiving a front image of the document and a back image of the document. The document upload application may transmit the front image of the document and the back image of the document to a backend system. Steps for extracting information from the front image and back image may be performed to determine whether a signature of the document is required, whether the required signature is present on the document, and merging a signature with the document image(s) after determining that an signature is needed but not present on the document. Steps for extracting may include extracting numerical text from a first predefined zone in the front image of the document and text associated with a user of the mobile device from a second predefined zone in the back image of the document. Extracting the text may be conditioned on whether the numerical text is above a particular threshold amount. A determination may be made whether the extracted text is empty (e.g., comprises a null value) in determining whether the signature is present on the document. If a signature is required but missing from the document, the document upload application may display a user prompt to populate a second predefined zone with the text associated with the user.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

In the drawings, like reference numbers generally indicate identical or similar elements. Additionally, generally, the leftmost digit(s) of a reference number identifies the drawing in which the reference number first appears.

DETAILED DESCRIPTION

Figure 1:
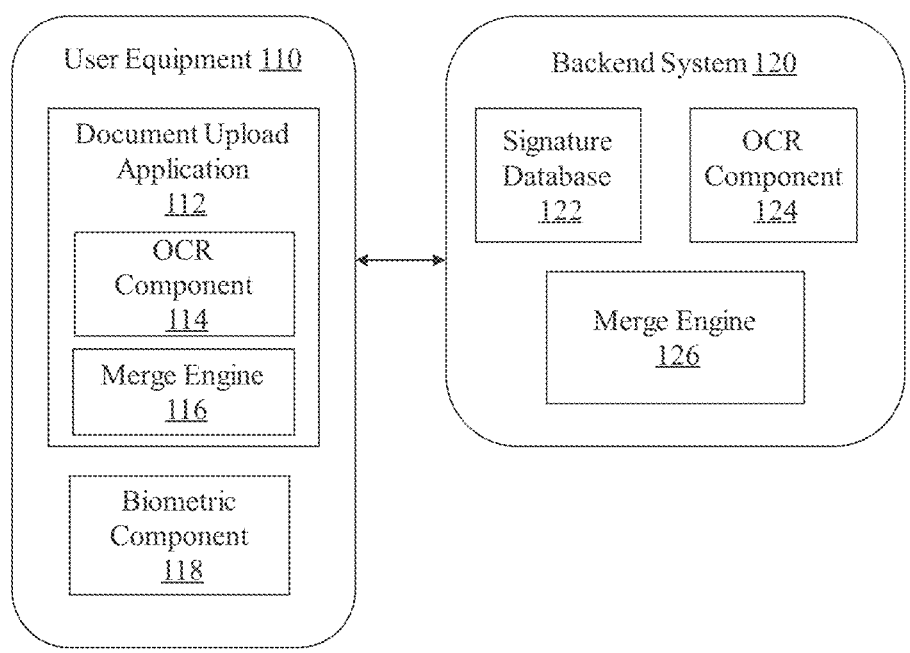
FIG. 1 is an exemplary document upload environment for providing mid-stream adjustments to a document upload process according to aspects of the present disclosure.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of aspects. However, it will be apparent that aspects may be practiced without these specific details. To avoid obscuring an aspect, some well-known circuits, system configurations, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system may be operated in any orientation.

Certain aspects have other steps or elements in addition to or in place of those mentioned. The steps or elements will become apparent to those skilled in the art from a reading of the following detailed description when taken with reference to the accompanying drawings.

System Overview and Function

Provided herein are a method, a system, computer program product embodiments, and/or combinations and sub-combinations thereof for providing signature-based techniques, including signature requirement detection, signature detection, and signature merger, during a document upload process. Endorsements include signatures but may also additional text, such as a predefined restrictive statement (e.g. "for deposit only," etc.), that defines or limits the purpose of the document The restrictive language may also restrict depositing the check to a specific background system. Signature endorsements are associated specifically with respective users of the document upload application whereas endorsements that include additional text that may be required to add another layer of security when uploading the document. The present disclosure relates to merging a signature onto a check, and particularly merging a signature onto the back of the check without regard to any restrictive statements.

In some embodiments, the technology described herein provides a system incorporates the signature techniques within a document upload process between a document upload application installed on user equipment and a backend system. Signature requirement detection can refer to determining, based on content in the document, whether a signature is required on the document before it is uploaded to the backend system. Examples of content include any combination of user identification, an amount specified within the document, and account information. The results of the signature requirement detection may trigger the signature detection for detecting the presence of the required signature on the document. And the results of the signature detection may then trigger the signature merger for electronically merging a signature with image data of a document to be uploaded, and transmitting the resulting merged signature-document image to the backend system.

In some embodiments, signature requirement detection and signature detection utilize character recognition to detect content in the document image(s) to perform their respective detection functions. The signature requirement detection and signature detection performed may be initiated automatically without user input such as upon the document upload application or the backend system receiving one or more images of the document being uploaded. For example, the document upload application may receive one or more images from a camera on the user equipment; the backend system may receive the one or more images from the document upload application. Accordingly, in some embodiments, some or all of the signature techniques may be performed solely by the document upload application, solely by the backend system, or distributed between both. In some embodiments, the signature requirement detection and signature detection may be performed upon receiving a user input, such as an instruction to proceed with the upload.

The technology described herein improves upon existing document upload processes by incorporating signature techniques for dynamically determining whether a signature is required on a document being uploaded and enabling the receipt of an electronic signature to be merged with the document image within the document upload process. This technology is advantageous to backend systems that process high-value documents, such as checks or other negotiable instruments, where signatures on the document mitigate the risk of fraudulent activity that may occur with such high-value documents. For example, in embodiments where the document to be uploaded is a check, certain backend systems (maintained by banks) may implement a threshold amount, such as $5,000, on checks that will trigger a signature requirement on the check to be accepted in the document upload process. When such high-value documents are detected, the document upload process may initiate the signature merger that allows a signature to be received at the user equipment and then merged into the document image. The merger may occur at the document upload application or at the backend system. The merger may require the signature to be placed at a predefined zone of the document.

In some embodiments, the signature merger may receive the digital signature via the document upload application and may either merge it with the document image as an overlay or merge it with the binary of the image (which is formed by transcoding the document image to a binary format). As an overlay, the signature may be visible in the appropriate location on the document in the merged document image. As part of the binary, the signature may be implemented as a private key that is incorporated into the binary of the image. The private key is not visible but is machine detectable as part of the document image data.

In an exemplary embodiment, the backend system may be configured to process certain types of documents such as checks or other financial instruments involving negotiable funds. Certain types of document, such as checks, may include predefined areas or zones where certain text should be inputted. Documents may include any number of predefined zones and the backend system may be configured to extract information from those predefined zones. For example, a document may have predefined zones for the numerical text, such as the check amount, for text describing the numerical text, and for endorsements, including signatures and the restrictive language.

The backend system may receive one or more images of the check being uploaded to a user account maintained by the backend system and that is associated with the document upload application. One or both of the document upload application and the backend system may include components for detecting content of the document during the document upload process, determining whether a signature is required on the document, determining whether the signature is already on the document, and merging a signature (if one is required and is missing from the document) with a document image to generate a merged image with the document and the signature. For example, the user account may be bank account (e.g., checking or savings) into which an amount specified by the check is to be deposited.

Therefore, the technology described herein solves one or more technical problems that exist in the realm of online computer systems and in particular, with existing document upload applications that do not assess the need for a signature on a document and provide the capability to merge a required signature with an image of the document to create a merged document image having the signature during the upload process. This prevents unnecessary steps to be taken by the document upload application, such as having to cancel the upload process (e.g., to allow for a manual signature to be added to the document). Prior upload processes lacking the technology disclosed herein, such as the technology to detect and then merge (if necessary) a signature, would simply outright prevent the upload of high-value documents or would allow such documents to be uploaded at the risk of potential fraudulent activity (if the check did not include a manual signature), exposing the backend system to potential losses and fraud. The technology described herein reduces that risk by improving the signature-based functions of the user equipment and the backend system.

This problem is rooted in the typical functioning of prior art document upload applications and backend systems which lacked the functions for detecting contents of the document, determining whether a signature is required on the document based on the detected contents, and merging a signature with the document image to create a merged document image, all within the flow of a document upload process. The technology as described herein provides an improvement in the functioning of the document upload application and the backend system by adding additional signature-based capabilities to each. One or more solutions described herein are necessarily rooted in computer technology through the modification of communications between the document upload application and the backend system as well as of the document upload application itself. Moreover, the steps of these techniques are only capable of being performed by a user equipment (with the document upload application installed) or the backend system such as the character recognition process for identifying the contents of the document and performing the electronic merger of an electronic signature with an electronic document image. The technology described herein reduces or eliminates the problem of conventional document upload processes as will be described in the various embodiments of FIGS. 1-5.

Various embodiments of these features will now be discussed with respect to the corresponding figures.

FIG. 1 is an exemplary document upload environment 100 for performing signature-based techniques on a document to be uploaded during a document upload process, according to aspects of the present disclosure. In one example, environment 100 comprises user equipment 110 and backend system 120.

In an exemplary embodiment, user equipment 110 may be implemented as a mobile device such as a smartphone or a tablet. User equipment 110 may include a document upload application 112 that is configured to connect with backend system 120 and a biometric component 118 for receiving user input associated with endorsing the document. In some embodiments, document upload application 112 may include optical character recognition (OCR) component 114 and merge engine 116. In some embodiments, backend system 120 may include signature database 122, OCR component 124, and merge engine 126.

Document upload application 112 may be configured to display a graphical user interface on user equipment 110. The graphical user interface may provide an interface to allow a user to enter information into document upload application 112 or select icons displayed on the screen. For example, one such icon might be to related to uploading an image of a document such as a check that will be transmitted to backend system 120. Document upload application 112 may include a camera function that utilizes a camera (not shown) of user equipment 110 to capture one or more images of a document being uploaded to the backend system 120. When it is determined that a signature is required on the document, document upload application 112 may also control the graphical user interface to display a screen to receive the user's physical signature, e.g., in the form of a finger pattern received on a touchscreen of user equipment 110. Document upload application 112 may store the received signature information in the form of a signature image that may be merged with the document image, such as in the form of an overlay.

In some embodiments, document upload application 112 may perform one or more of the signature-based techniques. In such embodiments, document upload application 112 may include OCR component 114 and merge engine 116 which are configured to perform one or more of the signature requirement detection, signature detection, and signature merger. As part of signature requirement detection, OCR component 114 may detect content of the document including any amounts listed in the document. The content may be located at predefined zones of the document. For example, a check may include predefined zones for the amount of money to be deposited into the user account.

Figure 2:
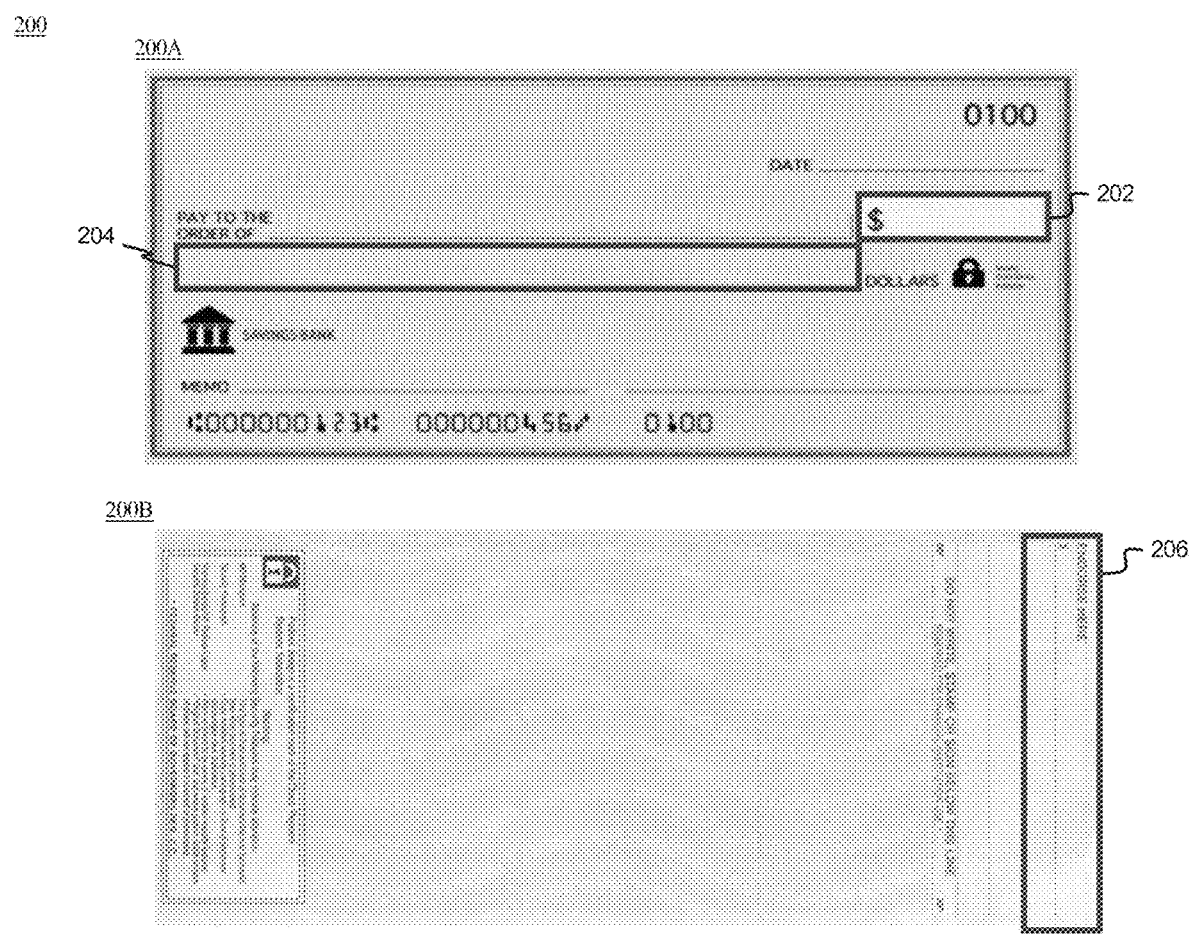
FIG. 2 is an exemplary depiction of a document to be uploaded during a document upload process according to aspects of the present disclosure.

FIG. 2 is an exemplary document 200 to be uploaded during a document upload process according to aspects of the present disclosure. Document 200 may include a front 200A and a back 200B. Front 200A may include predefined amount zones 202 and 204 that specify the amount of funds to be deposited into a user account. Predefined amount zone 202 may specify the amount in a numerical format. Predefined amount zone 204 may specify the amount in a written format. Back 200B may include a predefined signature zone 206 where the signature is required to be located, either physically on the paper or as an image, such as via an overlay on the document image. In some embodiments, predefined signature zone 206 may be left blank if a digital signature is used to sign a binary version of the image. Either the image overlay or digital signature may be accepted by backend system 120.

Returning to FIG. 1, if signature detection is required based on the results of the signature requirement detection, OCR component 114 may further determine whether a physical signature (i.e., a signature on the check itself) is present on the document by performing OCR on the document image. For example, OCR component 114 may locate predefined signature zone 206 of document 200 and detect whether any signature data is present in the document image.

If OCR component 114 determines that a signature is required but is missing from the document, document upload application 112 may pass control over the document upload process to merge engine 116 which receives the document images. Merge engine 116 may be responsible for determining the signature (e.g., simple or restrictive) that is required, retrieving the required signature, and performing the signature merger of the signature and the document images.

In some embodiments, merge engine 116 may determine whether a signature is required based on additional information received from OCR component 114. For example, OCR component 114 may provide the amount detected in performing OCR on the predefined amount zone 202 and/or predefined amount zone 204. Merge engine 116 may compare this amount with a threshold value which indicates that a signature is required for the document. For example, an amount below a threshold value may not require a signature while an amount that is above the threshold value may require a signature. Merge engine 116 may then retrieve the required signature either in real-time, via a user prompt on a graphical user interface provided by document upload application 112, or a pre-stored version of the signature, which may be stored in a secure location in user equipment 110 or in backend system 120. If a real-time signature is used, merge engine 116 will receive the physical signature provided via a touchscreen of user equipment 110. Retrieving the pre-stored signature may be based on interaction with biometric component 118.

Biometric component 118 may be implemented as any component that can receive biometric information from the user such as a fingerprint scanner, retina scanner or a camera configured to perform facial recognition. Biometric component 118 may be activated as needed by document upload application 112 during the upload process when it is determined that a signature is required on the document to continue the upload process. Instead of requiring the user to provide a signature via a touchscreen in the manner discussed above, document upload application 112 may utilize biometric component 118 to retrieve biometric information of the user in order to incorporate a pre-stored image signature into either the document image or the binary of the image. For example, upon verifying biometric data from biometric component 118, document upload application 112 may retrieve a pre-stored image signature from memory, of user equipment 110 or of backend system 120, and merge the pre-stored image signature as an overlay onto the document image to create a merged document image that includes the pre-stored image signature aligned in an appropriate predefined zone of the document. As another example, document upload application 112 may retrieve a digital signature (e.g., such as private key) from memory, of user equipment 110 or of backend system 120, and merge the digital signature with the binary image data of the document image. Either approach may be triggered based on verification of the biometric information from biometric component.

After retrieving the required signature, merge engine 116 may then merge the signature with the document image. If a physical signature (either real-time or a pre-stored version), merge engine 116 may merge the signature as an image overlay in the appropriate predefined zone of the document image, such as predefined signature zone 206. Document upload application 112 may display the merged document image with the signature on the graphical user interface. If a digital signature, merge engine 116 may merge the signature with a binary version of the image where the merged image includes a private key that is not viewable on the graphical user interface but is machine readable by the backend system 120.

In some embodiments, document upload application 112 may initiate the signature-based techniques described above automatically upon receipt of the documents or upon receiving a user instruction to initiate the document upload process, such as receiving a slide-to-deposit instruction from the user to initiate a check deposit.

Backend system 120 may include a signature database 122. In some embodiments, user signatures may be pre-stored in signature database 122. In some embodiments, rather than requiring the user to input his signature via the graphical user interface provided by document upload application 112 (i.e., during the document upload process), backend system 120 may utilize signatures from signature database 122. For example, when a signature is required on a document, backend system 120 may retrieve the required user signature from signature database 122. Retrieving the signature from signature database 122 may be conditioned based on biometric information received from biometric component 118. In some embodiments, backend system 120 may transmit the retrieved signature to document upload application 112 which may merge the signature with the document image and which may display the merged image on a graphical user interface. Document upload application 112 may then transmit the merged image to backend system 120. In some embodiments, backend system 120 may perform the signature merger.

Document upload application 112 performing signature merger (either through receiving the physical image via the touchscreen of user equipment 110 or via a pre-stored signature received from backend system 120) provides certain advantages such as reducing the number of images being transmitted to backend system 120 and ensures that images received at the backend system 120 already includes the required signature with the document image. In such embodiments, document upload application 112 only needs to send the required amount of document images (e.g., front 200A and back 200B) to backend system 120 and no further processing is required by backend system 120.

Backend system 120 performing signature merger (either through receiving the physical image of the signature from the document upload application 112 or via the pre-stored signature retrieved from signature database 122) also provides advantages such as increased security because the merger process occurs at the backend system 120 rather than on a user equipment 110. In such embodiments, backend system 120 generates additional document images in addition to the document images (that do not include the required signature) received from document upload application 112. These additional document images are images that include the merged document image that include the required signature. Backend system 120 must ensure that the generated additional document images are linked to the document images received from document upload application 112. For example, backend system 120 may link the reference identifiers of the received document images to the reference identifier of the new merged document image. This additional step could increase latency of the document upload process with the benefit of providing the backend system more control over the signature merger. This issue is avoided when document upload process performs the signature merger because only the required document images, that already include the signature, are transmitted to the backend system 120.

In some embodiments, the backend system 120 may be implemented as one or more servers. Backend system 120 may be implemented as a variety of centralized or decentralized computing devices. For example, backend system 120 may be a mobile device, a laptop computer, a desktop computer, grid-computing resources, a virtualized computing resource, cloud computing resources, peer-to-peer distributed computing devices, a server farm, or a combination thereof. Backend system 120 may be centralized in a single device, distributed across multiple devices within a cloud network, distributed across different geographic locations, or embedded within a network. Components of backend system 120, such as signature database 122, OCR component 124, and merge engine 126 may be implemented within the same device (such as when backend system 120 is implemented as a single device) or as separate devices (such as when backend system 120 is implemented as a distributed system with components connected via a network).

In some embodiments, backend system 120 may perform one or more of the signature-based techniques in coordination with or independently of document upload application 112. In such embodiments, backend system 120 may include OCR component 124 and merge engine 126 which are configured to perform one or more of the signature requirement detection, signature detection, and signature merger. In some embodiments, document upload application 112 may perform all steps of signature requirement detection, signature detection, and signature merger. In some embodiments, document upload application 112 and backend system 120 may employ a hybrid approach where document upload application 112 performs some of the steps and backend system 120 performs the other steps.

OCR component 124 may be implemented in a similar manner as OCR component 114. Merge engine 126 may be implemented in a similar manner as merge engine 126. As noted above, implementing these components on backend system 120 may increase the security of the document upload process at the cost of increased latency in processing the document images.

In some embodiments, backend system 120 is configured to perform all steps of signature requirement detection, signature detection, and signature merger. OCR component 124 receives document images from user equipment 110. OCR component 124 may then detect content of the document images including any amounts listed in the document by identifying content located at predefined zones of the document and the presence of a signature (if needed, based on the detected amount of the document). OCR component 124 may next determine whether a signature is required but is not present on the document (as determined from the document images). OCR component 124 passes the document images to merge engine 126 which may determine whether a signature is required based on the information received from OCR component 124. For example, OCR component 124 may provide the amount detected in performing OCR on the predefined amount zone 202 and/or predefined amount zone 204. Merge engine 126 may then determine whether a signature is needed in a similar manner discussed above. Merge engine 126 may retrieve the required signature. If a real-time signature is required, merge engine 126 may transmit a signal to document upload application 112 to display, via the graphical user interface, an interface for receiving the user signature via interaction with the touchscreen of the user equipment. In other embodiments, merge engine 126 may retrieve a pre-stored version of the required signature from a memory of backend system 120. Retrieving the pre-stored signature may be based on merge engine 126 transmitting a signal to biometric component 118 which would operate in a similar manner described above to receive biometric information to authorize the use of the pre-stored signature.

After retrieving the required signature, merge engine 126 may then merge the signature with the document image. If a physical signature (either in real-time or a pre-stored version), merge engine 126 may merge the signature as an overlay in the appropriate location of the document image, such as predefined signature zone 206. If a digital signature, merge engine 126 may merge the signature with a binary version of the image.

In some embodiments, various step of signature requirement detection, signature detection, and signature merger are distributed between document upload application 112 and backend system 120. For example, document upload application 112 may perform the steps of signature requirement detection and signature detection while backend system 120 performs the steps of signature merger. For example, document upload application 112 may determine whether a signature is required for the document and if so, whether the required signature is present on the document. If a required signature is not present, document upload application 112 may transmit the document images and an indication of the signature that is required for the document to backend system 120 which may then perform signature merger based on the received information.

The components described in FIG. 1 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the environment 100 or installed as a removable portion of the environment 100.

Environment 100 can be used in a variety of areas implementing document upload techniques. These include financial applications, security applications, etc. where documents being uploaded into user accounts may be subject to fraudulent activity. For example, when processing important document such as driver's licenses, checks, financial documents, etc. The environment 100 allows for dynamic signature-based techniques to be utilized during a document upload process and requires image processing steps that cannot be practicably performed in the human mind.

Methods of Operation

Figure 3:
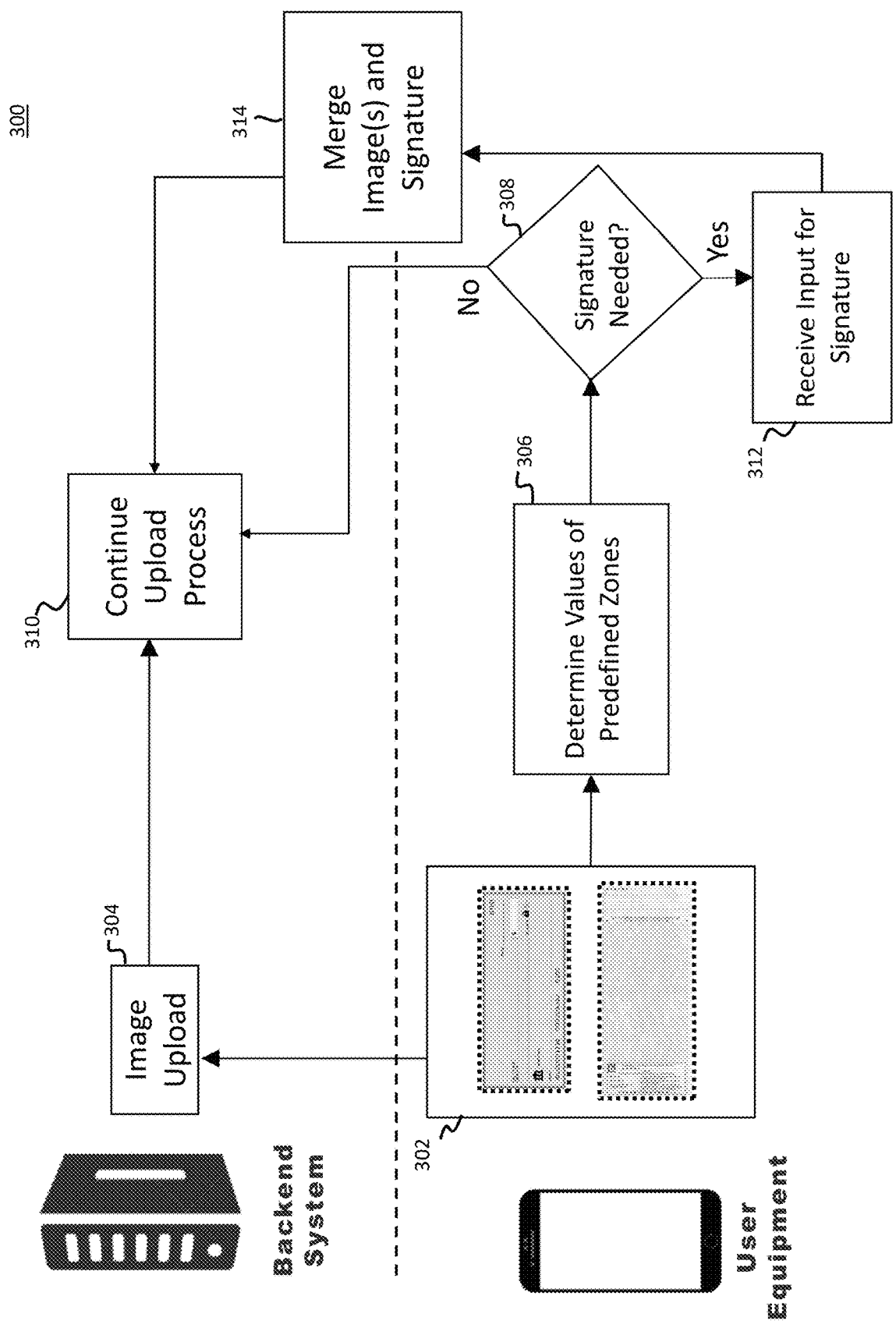
FIG. 3 is an example method of a document upload process for performing signature verification at a user equipment, according to aspects of the present disclosure.

FIG. 3 is an example method 300 of operating the environment 100 to perform signature-based techniques of document images being uploaded to a user account maintained by backend system 120, according to aspects of the present disclosure. As a non-limiting example with regards to FIG. 1, one or more processes described with respect to FIG. 3 may be performed by one or more devices of environment 100. In such an embodiment, the one or more devices of environment 100 may execute code in memory to perform certain steps of method 300. While method 300 of FIG. 3 will be discussed below as being performed by one or more components of environment 100, other devices not shown may store the code and therefore may execute method 300 by directly executing the code. Accordingly, the following discussion of method 300 will refer to devices of FIG. 1 as an exemplary non-limiting embodiment of method 300. Moreover, method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

At step 302, document upload application 112 installed in user equipment 110 receives image data of a document being uploaded to backend system 120, such as by controlling a camera on user equipment 110. The image data may represent a number of images of the document that are needed by backend system to complete the document upload process. In some embodiments, the image data may include a front and back capture of a single page document, such as the front and back of a check. In some embodiments, the image data may include multiple images of the pages of a multi-page document or different documents being uploaded together. In some embodiments, document upload application 112 may be configured with a parameter indicating the number of document images to be captured of the document being uploaded. For example, the graphical user interface provided by document upload application 112 may be configured to require capturing both a front image of the document and a second image of the document based on the number of images that are needed by backend system 120 to upload the document.

At step 304, document upload application 112 transmits the image data to backend system 120, which may cache the received images in a temporary location in backend system 120 such as an S3 bucket implemented with a cache control. In some embodiments, the image data includes a front image of the document and a back image of the document.

Document upload application 112 may perform signature requirement detection, signature detection, and signature merger at steps 306-312.

At step 306, document upload application 112 may determine values of predefined zones in the document from the document images. OCR component 114 may utilize optical character recognition (OCR) to determine the values from the document images. In some embodiments, document upload application 112 may be configured to process a specific type of document, such as a check, and performs OCR on one or more predefined zones of that type of document, such as predefined amount zones 202 and 204 and predefined signature zone 206. For example, OCR component 114 may determine a value of the deposit amount from one or both of predefined amount zones 202 and 204 and may determine whether a signature is present at predefined signature zone 206 In some embodiments, document upload application 112 may perform OCR automatically upon capturing document images in step 302. In some embodiments, document upload application 112 waits for a user instruction, such as an instruction to proceed with the document upload process, before performing OCR.

At step 308, document upload application 112 may determine whether a signature is needed based on the values of the predefined zones determined at step 306. For example, the document may include a predefined zone on the front of a document for numerical text, such as check amount. OCR component 114 may extract, from the predefined zone, a numerical text. The extracted value may be compared with a threshold amount (e.g., a setting established by backend system 120) to determine whether backend system 120 requires a signature on the document based on the extracted value.

After determining that a signature is required (e.g., based on the numerical text extracted from a predefined zone of the front image of the document being above a threshold value), OCR component 114 may next perform signature detection to determine whether the signature is present on the document being uploaded. In some embodiments, OCR component 114 may perform OCR on a predefined zone of the document image (e.g., predefined signature zone 206 from document 200) to determine whether the required signature present in the image data. For example, OCR component 114 may extract any text from the predefined zone of a back image of the document. In some embodiments, the text corresponds to the signature of the user ted with a user of the mobile device, such as the signature of the user. OCR component 114 may determine whether the required signature is on the document based on the extracted text. For example, if the extracted data is null (or comprises a null value which indicates that the predefined zone is blank), OCR component 114 may determine that the required signature (or any signature) is on the document. In some embodiments, if the extracted data is not empty (i.e., the document already has a signature), OCR component 114 may proceed to step 310 or may perform an additional check to determine whether the extracted data matches the required signature. For example, OCR component 114 may attempt to match the extracted data to a pre-stored signature which may be stored in a secure memory location of user equipment 110 or received from backend system 120.

At step 310, if document upload application 112 determines that a signature is not required on the document, it permits the upload process to continue which may include proceeding with uploading the document to backend system 120 which may perform any other additional processing of the document to complete the upload process.

At step 312, if document upload application 112 determines that a signature is required and that the extracted text is null based on the analysis of the image data of the document at step 308, document upload application 112 proceeds with a first step of signature merger to receive a user input for the signature. Merge engine 116 may determine whether a real-time signature or a pre-stored signature may be used. This determination may be based on a setting retrieved from a memory of user equipment 110 and may be set by a user or backend system 120. If merge engine 116 determines that a real-time signature is to be used, it may display a user prompt, such as a signature box for receiving an signature or a request for biometric authentication for retrieving a pre-stored signature, on the touchscreen of user equipment 110. If merge engine 116 determines that a pre-stored signature is to be used, it may submit a request after receiving authentication from the user such as from biometric component 118. The request may include user identification associated with the document upload application 112 and requests the signature from backend system 120.

In some embodiments, the request may be triggered by user input such as biometric input received via biometric component 118. Backend system 120 identify the pre-stored signature in signature database 122 based on information in the request. In some embodiments, the pre-stored signature may be a signature image to be used as an overlay over a predefined signature zone of a document. In some embodiments, the pre-stored signature may be a digital signature, such as a private key, that is applied to the binary format of the image. In some embodiments, backend system 120 may transmit the pre-stored signature back to document upload application 112 for performing the signature merger at merge engine 116. In some embodiments, backend system 120 may perform the signature merger by receiving the document images from document upload application 112 and performing the merger using merge engine 126. After retrieving the required signature, backend system 120 may transmit a signal to document upload application 112 to transmit the document images to backend system 120.

Step 314 may be performed by document upload application 112 or by backend system 120. In some embodiments, merge engine 116 merges the document image with the required signature (either one received via the touchscreen of user equipment 110 or from backend system 120). In some embodiments, the merged image may include an overlay of the signature over a predefined signature zone of the document. In some embodiments, the merged image is a digital signature (such as a private key) applied to a binary format of the image. In some embodiments, backend system 120 merges the document image received from document upload application 112 with the signature (either one transmitted from user equipment 110 or retrieved from signature database 122 of backend system 120).

In some embodiments, backend system 120 may determine whether to perform the signature merger at the document upload application 112 or at backend system 120. For example, backend system 120 may determine that certain documents (e.g., those with amounts greater than a threshold) may warrant higher security and that the signature merger should take place at the backend system.

After signature merger is completed, by either document upload application 112 or backend system 120, the document upload process may continue with the merged image at step 310.

Figure 4:
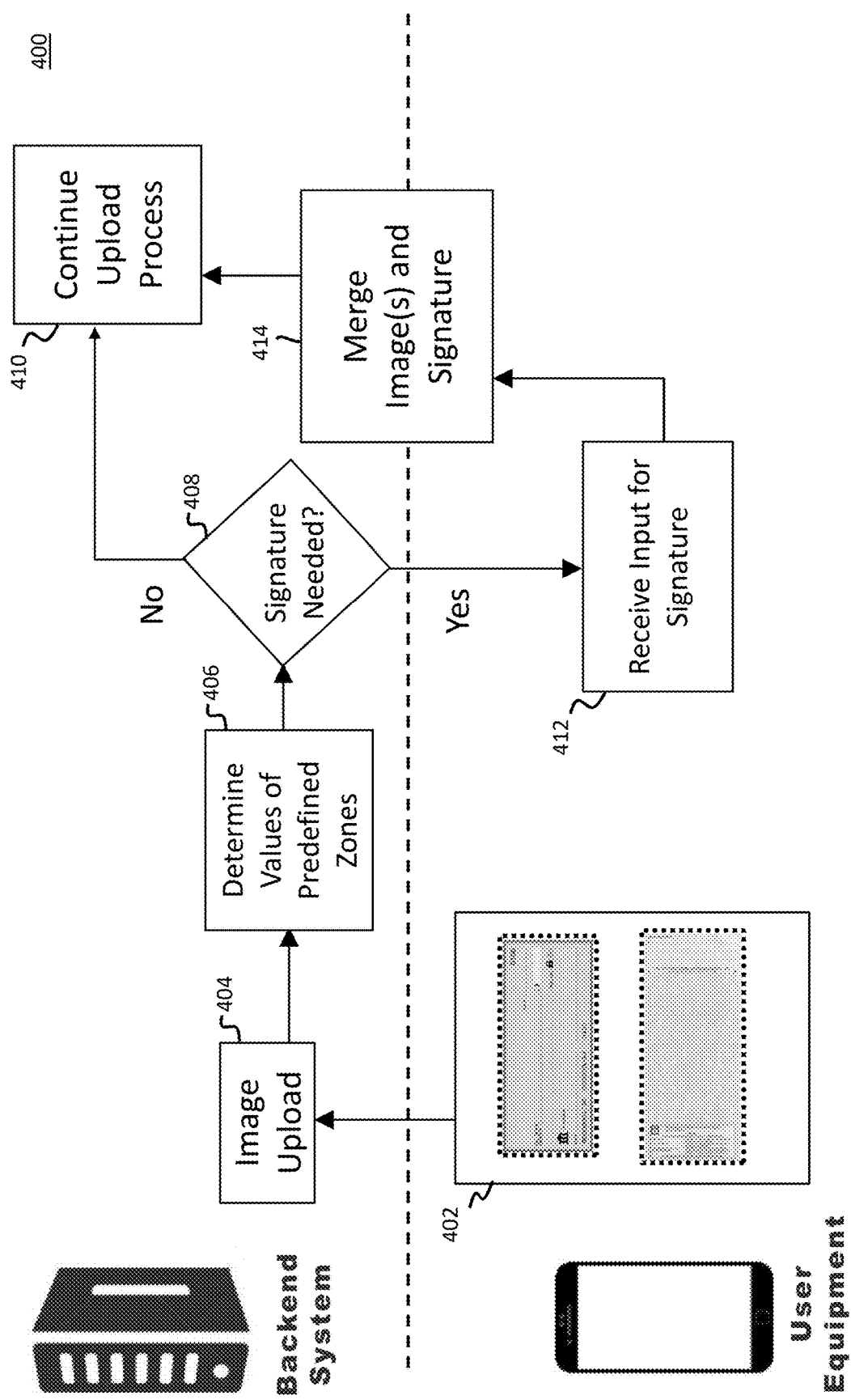
FIG. 4 is an example method of a document upload process for performing signature verification at a backend system, according to aspects of the present disclosure.

FIG. 4 is an example method 400 of operating the environment 100 to perform signature-based techniques of document images being uploaded to a user account maintained by backend system 120, according to aspects of the present disclosure. As a non-limiting example with regards to FIG. 1, one or more processes described with respect to FIG. 2 may be performed by one or more devices of environment 100. In such an embodiment, the one or more devices of environment 100 may execute code in memory to perform certain steps of method 400. While method 400 of FIG. 4 will be discussed below as being performed by one or more components of environment 100, other devices not shown may store the code and therefore may execute method 400 by directly executing the code. Accordingly, the following discussion of method 400 will refer to devices of FIG. 1 as an exemplary non-limiting embodiment of method 400. Moreover, method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

At step 402, document upload application 112 receives image data of a document being uploaded to backend system 120 in a similar manner described with respect to step 302 of FIG. 3.

At step 404, document upload application 112 transmits the image data to backend system 120, which may cache the received images in a temporary location in backend system 120 such as an S3 bucket implemented with a cache control.

At step 406, backend system 120 may determine values of predefined zones in the document from the document images. OCR component 124 may utilize optical character recognition (OCR) to determine the values from the document images received from document upload application 112. In some embodiments, backend system 120 may be configured to accept specific types of document, such as a check, and performs OCR on one or more predefined zones of that type of document, such as predefined amount zones 204 and 206 and predefined signature zone 208. For example, OCR component 124 may determine a value of the deposit amount and whether a signature is present on the document in the same manner discussed above with respect to OCR component 114. In some embodiments, OCR component 124 may perform OCR automatically upon receiving the document images in step 302. In some embodiments, OCR component waits to receive a user instruction, such as an instruction to proceed with the document upload process, from document upload application 112 before performing OCR.

At step 408, backend system 120 may determine whether a signature is needed based on the values of the predefined zones determined at step 406. OCR component 124 may extract, from the predefined zone, a numerical text and process the numerical text in the same manner discussed above with respect to OCR component 114. OCR component 124 may compare the extracted value may be compared with a threshold amount (e.g., a global setting that is applicable to documents supported by backend system 120) to determine whether a signature is required based on the extracted value.

At step 410, if backend system 120 determines that an signature is not required on the document, it permits the upload process to continue which may include proceeding with processing of the uploaded document images.

At step 412, if backend system 120 determines that a signature is required and that the extracted text is null based on the analysis of the image data of the document at step 408, backend system 120 may transmit a signal to document upload application 112 to receive a user input for the signature. Merge engine 126 may determine whether a real-time signature or a pre-stored signature may be used which defines the type of user input that is required. If a real-time signature is to be used, document upload application 112 may display a user prompt, such as a signature box for receiving a signature or a request for biometric authentication for retrieving a pre-stored signature, on the touchscreen of user equipment 110. If a pre-stored is to be used, the document upload application may request user authentication, such as a password or biometric information, in order to retrieve the pre-stored signature from signature database 122.

Step 414, which merges the retrieved signature with the document image, may be performed by document upload application 112 or by backend system 120 and may be implemented in the same way discussed with respect to step 314.

After signature merger is completed, the document upload process may continue with the merged image at step 410.

Components of the System

Figure 5:
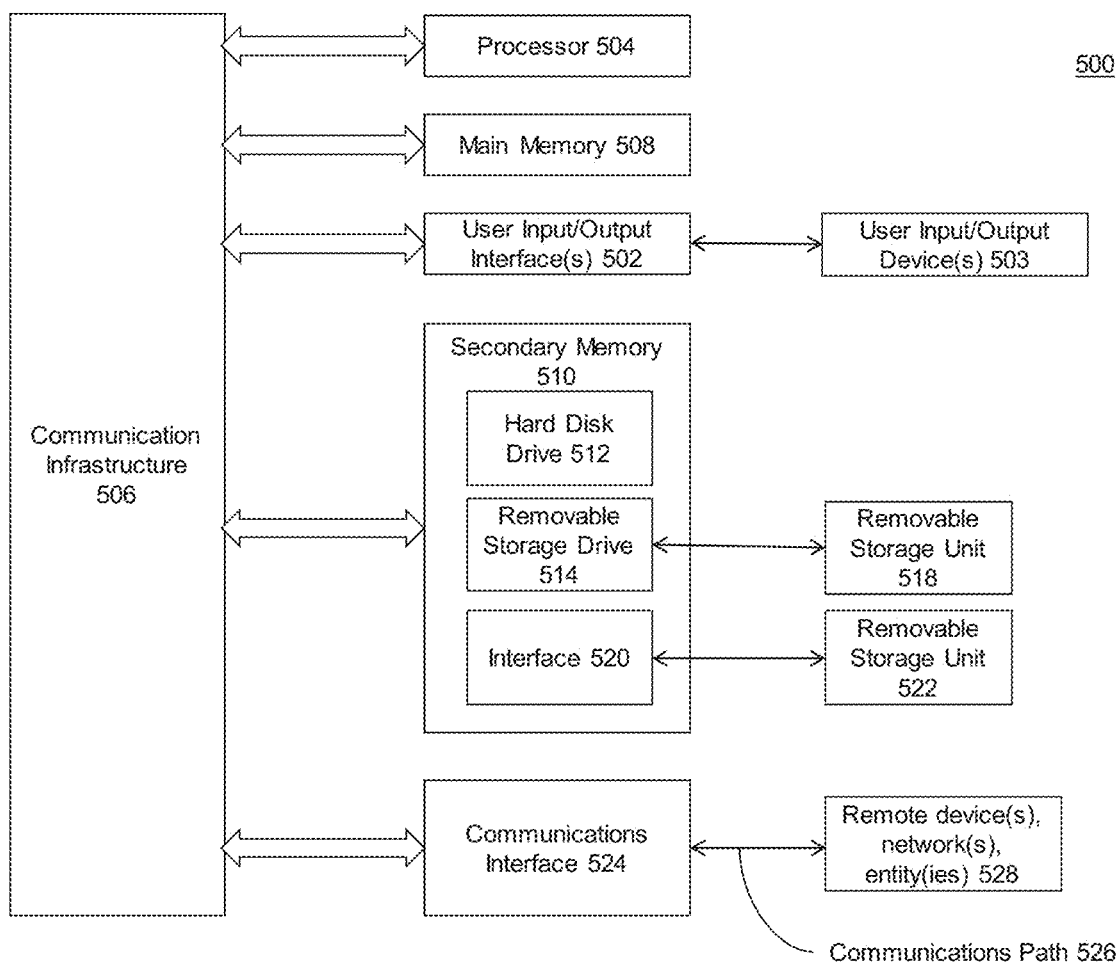
FIG. 5 is an example architecture of devices that can be used to implement the system according to aspects of the present disclosure.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The modules or units in the following description of the aspects may be coupled to one another as described or as shown. The coupling may be direct or indirect, without or with intervening items between coupled modules or units. The coupling may be by physical contact or by communication between modules or units.

The above detailed description and aspects of the disclosed environment 100 are not intended to be exhaustive or to limit the disclosed environment 100 to the precise form disclosed above. While specific examples for environment 100 are described above for illustrative purposes, various equivalent modifications are possible within the scope of the disclosed environment 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

These and other valuable aspects of the aspects of the present disclosure consequently further the state of the technology to at least the next level. While the disclosed aspects have been described as the best mode of implementing environment 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer-implemented method for validating a document during a document upload process, the method comprising:
receiving, by a document upload application on a mobile device, a front image of the document and a back image of the document;
transmitting, by the mobile device to a backend system, the front image of the document and the back image of the document;
extracting numerical text from a first predefined zone in the front image of the document;
extracting text associated with a user of the mobile device from a second predefined zone in the back image of the document and responsive to the numerical text being above a threshold value;
determining that the text associated with the user comprises a null value;
displaying, by the document upload application on the mobile device and responsive to the determining, a user prompt to populate the second predefined zone with the text associated with the user, wherein the text associated with the user comprises one of a physical signature or a digital signature;
determining, based on the user prompt, to utilize the physical signature or the digital signature; and
responsive to determining to utilize the digital signature:
retrieving the digital signature; and
merging the digital signature with binary image data of the document; and
responsive to determining to utilize the physical signature:
receiving an instruction to populate the second predefined zone with the text associated with the user; and
merging the text associated with the user with the back image of the document to create a merged back image.

2. The computer-implemented method of claim 1, further comprising:
transmitting, from the mobile device to the backend system, the merged back image.

3. The computer-implemented method of claim 1, wherein the instruction indicates that the text associated with the user is to be received via the mobile device, the method further comprising:
receiving, from a touchscreen display of the mobile device, the text associated with the user.

4. The computer-implemented method of claim 1, wherein the instruction indicates that the text associated with the user is to be provided by the backend system and wherein the instruction is configured to cause the backend system to retrieve the text associated with the user from a database of the backend system.

5. The computer-implemented method of claim 1, wherein the first predefined zone is associated with a monetary amount and the threshold value is a numerical amount retrieved from the backend system.

6. The computer-implemented method of claim 1, wherein the second predefined zone is a signature block.

7. The method of claim 1, wherein the digital signature is comprises data that is not visible for display but is machine detectable.

8. The method of claim 1, wherein the digital signature comprises a private key.

9. The method of claim 1, further comprising transcoding the document into a binary format version.

10. A mobile device for validating a document during a document upload process, the mobile device comprising:
a memory;
at least one processor coupled to the memory and configured to:
receive, by a document upload application on the mobile device, a front image of the document and a back image of the document;
transmit, to a backend system, the front image of the document and the back image of the document;
extract numerical text from a first predefined zone in the front image of the document;
extract text associated with a user of the mobile device from a second predefined zone in the back image of the document and responsive to the numerical text being above a threshold value;
determining that the text associated with the user comprises a null value;
display, by the document upload application on the mobile device and based on the determining, a user prompt to populate the second predefined zone with the text associated with the user, wherein the text associated with the user comprises one of a physical signature or a digital signature;
determine, based on the user prompt, to utilize the physical signature or the digital signature; and
responsive to determining to utilize the digital signature:
retrieve the digital signature; and
merge the digital signature with binary image data of the document.

11. The mobile device of claim 10, wherein responsive to determining to utilize the physical signature, the processor is further configured to:
receive an instruction to populate the second predefined zone with the text associated with the user; and
merge the text associated with the user with the back image of the document to create a merged back image.

12. The mobile device of claim 11, wherein the processor is configured to:
transmit, to the backend system, the merged back image.

13. The mobile device of claim 11, wherein the instruction indicates that the text associated with the user is to be received via the mobile device, the processor further configured to:
receive, from a touchscreen display of the mobile device, the text associated with the user.

14. The mobile device of claim 11, wherein the instruction indicates that the text associated with the user is to be provided by the backend system and wherein the instruction is configured to cause the backend system to retrieve the text associated with the user from a database of the backend system.

15. The mobile device of claim 10, wherein the first predefined zone is associated with a monetary amount and the threshold value is a numerical amount retrieved from the backend system.

16. The mobile device of claim 10, wherein the second predefined zone is a signature block.

17. A non-transitory computer-readable medium storing instructions, the instructions, when executed by a processor on a mobile device for validating a document during a document upload process, cause the processor to perform operations comprising:
receiving, by a document upload application on a mobile device, a front image of the document and a back image of the document;

transmitting, by the mobile device to a backend system, the front image of the document and the back image of the document;

extracting numerical text from a first predefined zone in the front image of the document;

extracting text associated with a user of the mobile device from a second predefined zone in the back image of the document and responsive to the numerical text being above a threshold value;

determining that the text associated with the user comprises a null value;

displaying, by the document upload application on the mobile device and based on the determining, a user prompt to populate the second predefined zone with the text associated with the user, wherein the text associated with the user comprises one of a physical signature or a digital signature;

determining, based on the user prompt, to utilize the physical signature or the digital signature; and responsive to determining to utilize the digital signature:
  retrieving the digital signature; and
  merging the digital signature with a binary format version of the document.

18. The non-transitory computer-readable medium of claim 17, wherein the numerical text is a monetary amount to be deposited to a user account maintained by the backend system and wherein responsive to determining to utilize the physical signature, the operations further comprising:
  receiving an instruction to populate the second predefined zone with the text associated with the user; and
  merging the text associated with the user with the back image of the document to create a merged back image.

19. The non-transitory computer-readable medium of claim 18, the operations further comprising:
  transmitting, from the mobile device to the backend system, the merged back image.

20. The non-transitory computer-readable medium of claim 18, wherein the instruction indicates that the text associated with the user is to be received via the mobile device, the operations further comprising:
  receiving, from a touchscreen display of the mobile device, the text associated with the user.

\* \* \* \* \*